United States Patent [19]

Popov et al.

[11] 4,208,598
[45] Jun. 17, 1980

[54] ELECTRICAL MACHINE WITH CRYOGENIC COOLING

[76] Inventors: Jury S. Popov, ulitsa Bariernaya, 16, kv. 14; Gennady S. Gorbunov, ulitsa Polzunova, 35, kv. 42, both of Novosibirsk; Jury V. Skachkov, Nevsky prospekt, 125, kv. 13, Leningrad; Jury I. Badrukhin, ulitsa Polzunova, 4, kv. 6, Novosibirsk, all of U.S.S.R.

[21] Appl. No.: 904,400
[22] Filed: May 10, 1978
[51] Int. Cl.² .............................................. H02K 5/18
[52] U.S. Cl. ...................................... 310/64; 165/86
[58] Field of Search .................. 310/64, 10, 40, 52; 165/86

[56] References Cited
U.S. PATENT DOCUMENTS

| 3,648,082 | 3/1972 | MacNab | 310/10 |
|---|---|---|---|
| 3,679,920 | 7/1972 | MacNab | 310/10 |
| 3,764,835 | 10/1973 | Luck | 310/10 |
| 3,816,780 | 6/1974 | Smith | 310/52 |
| 3,956,648 | 5/1976 | Kirtley | 310/10 |
| 4,034,245 | 7/1977 | Mailfert | 310/52 |
| 4,044,824 | 8/1977 | Eskell | 62/86 |
| 4,063,122 | 12/1977 | Kullman | 310/64 |
| 4,085,343 | 4/1978 | Hasegawa | 310/261 |

*Primary Examiner*—R. Skudy
*Attorney, Agent, or Firm*—Lackenbach, Lilling & Siegel

[57] ABSTRACT

An electrical machine with cryogenic cooling, comprising a superconducting field winding rigidly fixed to the shaft of a hollow rotor. The rotor is filled with a coolant which flows from the cavity of said rotor through heat exchangers mounted on the end face portions of the rotor. The design of the proposed machine provides for an increased effectiveness of thermal isolation of the superconducting field winding.

6 Claims, 4 Drawing Figures

ELECTRICAL MACHINE WITH CRYOGENIC COOLING

FIELD OF THE INVENTION

The invention relates to electrical machines, and more particularly, to cryogenic fluid-cooled electrical machines. It is applicable to electric motors, generators, dynamotors suitable for steam, thermal and other power plants, as well as in ground and aerospace vehicles.

DESCRIPTION OF THE PRIOR ART

A cryogenic fluid-cooled electrical machine utilizing a standard circuit is provided with a rotor made as a rotatable cryostat shielded thermally and electromagnetically and houses a superconducting field winding which is maintained in a superconducting condition with the help of a coolant for cooling it down to a temperature of 4.5° K. It is common practice to use liquid helium as a coolant. The proper selection of a cryostatic system for the superconducting winding is important. From a cooling machine or a refrigerating vessel, liquid helium is fed to the superconducting winding, washes it and is then removed from the machine. Thermal insulation is necessary for the low-temperature zone of the superconducting winding to prevent the influx of heat transferred through convection and radiation as well as the heat carried by the reinforcement elements of the winding. Moreover, an electrical machine with cryogenic cooling must be of reliable design. This means that its rotor must receive the whole torque from the superconducting winding and must provide concurrently sufficient mechanical rigidity to resist temperature stress responsible for rotor vibration. On the other hand, too great an influx of heat to the superconducting winding which is in direct proportion to the cross-section of the reinforcement elements serving for secure attachment of the winding.

Known in the art is an electrical machine with cryogenic cooling, (cf. U.S. application Ser. No. 855,778; Nov. 29, 1977) comprising a superconducting field winding, disposed in the cavity of a rotor filled with a coolant and rigidly secured to the rotor shaft, and a thermal electromagnetic shield disposed in an evacuated space between the rotor and a casing. The shield is cooled by the coolant which flows from the cavity of the rotor through coolant supply annular chambers disposed in close proximity to the end face walls of the rotor. In such machine, the cavity of the rotor filled with the coolant is defined by a shell whose end face wall is rigidly fixed to the rotor shaft.

The machine has a major disadvantage in that the end face wall of the rotor shell is rigidly secured to the rotor shaft and to the coolant supply annular chamber. This method of attachment of the shell results in a condition in which the heat generated in the shield is transferred along the end face wall of the rotor shell direct to the liquid helium with which the rotor cavity is filled. This also applies to the heat carried from the shield to the superconducting winding by the construction components of the shaft since the shield is rigidly connected with the shaft and the latter has no means for removing that heat.

Moreover, starting-up the machine accompanied by a sudden temperature drop causes the rotor shell to assume a state characterized by complex stress. The end face walls of the shell are influenced by axial forces developed due to different expansion (contaction) of the shell and the rotor shaft in the case of a large temperature drop; on the other hand, there exist forces developed by the pressure of the liquid helium as well as centrifugal forces acting upon the shell and its end walls. Therefore, the end walls of the shell must be massive in order to ensure appropriate stability thereof and the shell proper.

SUMMARY OF THE INVENTION

It is an object of the invention to provide for an electrical machine with cryogenic cooling in which the influx of heat carried by the rotor shaft to its superconducting field winding is substantially reduced.

Another object of the invention is to provide for an electrical machine with cryogenic cooling featuring a high operational reliability.

Still another object of the invention is to provide for a reduction in the length of the rotor shaft of the machine, which therefore results in a smaller or reduced overall size of the machine.

In accordance with the invention, there is provided an electrical machine with cryogenic cooling, comprising a superconducting field winding mounted in the cavity of a rotor filled with a coolant. The winding is rigidly secured to a shaft of the rotor, and a thermal-/electromagnetic shield is also secured rigidly on the rotor shaft and is disposed in an evacuated space between the rotor and a casing. The shield is cooled by the coolant which flows to the shield from the cavity of the rotor which flows to the shield from the cavity of the rotor through coolant supply annular chambers which are located in close proximity to the end face walls of the rotor. The end face walls of the rotor and the end face walls of the chambers facing said end face walls are provided with neck portions fitted coaxially with the shaft of the rotor, and are arranged in spaced relationship to form a gap between each other. Their ends are interconnected and the gap between said neck portions are adapted to communicate with the evacuated space between the rotor and the casing, and two heat exchangers are disposed within said neck portions.

With the design of the rotor of the electrical machine it is possible to reduce the influx of heat carried to the rotor by its shaft and generated in the shield as well as to reduce the influx of heat carried by the rotor shell.

Preferably, the stresses developed in the rotor shell are eliminated due to the availability of heat exchangers made as helical ribs on the rotor shaft and within the neck portions, and said helical ribs are arranged in spaced relationship with respect to each other.

DESCRIPTION OF THE DRAWINGS

The present invention will be further described, by way of example only with reference to the accompanying drawings in which.

DESCRIPTION OF THE INVENTION

Figure 1:
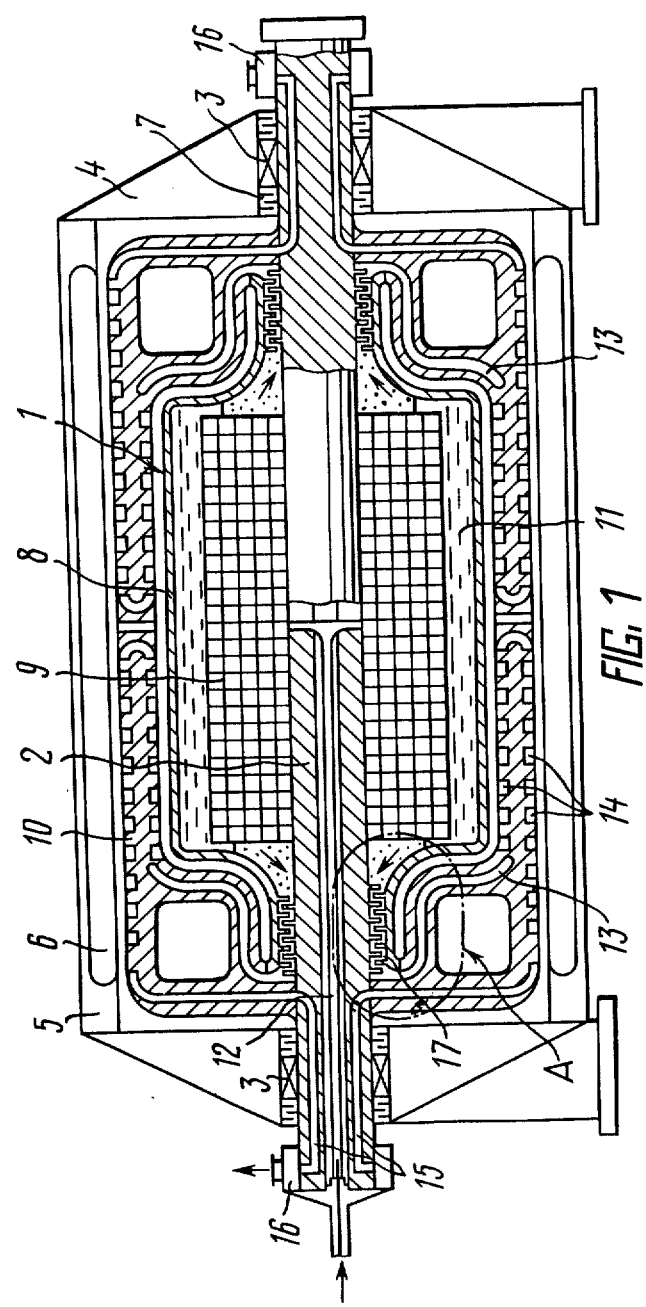
FIG. 1 is a longitudinal-sectional view of an electrical machine with cryogenic cooling manufactured according to the invention.

The electrical machine with cryogenic cooling comprises a hollow rotor 1 (FIG. 1) having a shaft 2 rotatably mounted in bearings 3 disposed in end face plates 4 of a casing 5 whose inner surface mounts a stator winding. The design of the stator is not shown in detail. A vacuum is maintained in a space between the rotor 1 and the casing 5 to provide for thermal isolation of the rotor 1. To maintain a vacuum condition, rotatable vacuum-tight seals 7 are disposed in the end face plates 4.

The hollow rotor 1 includes a cylindrical shell 8 whose end face walls are adjacent the shaft 2. Within the shell 8, there is a superconducting field winding 9 which is fixed to the shaft 2 with the help of a suitable adhesive, such as an epoxy resin adhesive. The winding 9 is made of a material which behaves as a superconductor at temperatures below the critical one. For this purpose, use may be made of an Nb-Ti alloy wire stabilized by a pure copper matrix.

The evacuated space between the casing 5 and the shell 8 surrounds a thermal/electromagnetic shield 10 of a material which is a superconductor and has good electrical conductivity. The shield 10 is made in the form of a cylinder having cooling passages and end face walls which serve to rigidly attach the cylinder to the shaft 2 of the rotor.

The superconducting field winding 9 is cooled by a coolant 11 (such as liquid helium) and is brought to a superconducting condition. The coolant 11 fills the cavity of the rotor 1, and is circulated through the ducts (not shown) in the winding 9.

To enable the coolant 11 to pass into the cavity of the rotor 1, the shaft 2 has a central bore drilled in one of its ends, and a vacuum-sealed conduit 12 being is disposed within said central bore. Coolant supply annular chambers 13 are located in close proximity to the end face walls of the rotor 1 and are spaced apart therefrom by an evacuated gap, thereby providing a path for the coolant 11 flowing to the shield 10. The end face walls of the chambers (13), facing the end face walls of the rotor 1, are formed by the end face walls of the shield 10. The shield is provided with ducts 14 for circulating the coolant 11. On both ends of the shaft 2 of the rotor 1, there are provided return ducts 15, for removing the coolant 11, which communicates with the ducts 14 and with gas collectors 16 set on both the ends of the shaft 2.

Heat exchangers 17 mounted on the face ends of the shaft 2 are used to prevent heat influx to the cavity of the rotor 1.

Figure 2:
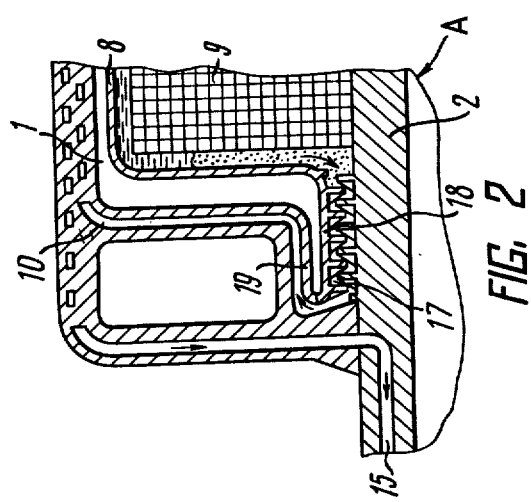
FIG. 2 is a fragmentary, sectional view of the assembly A of FIG. 1, on an enlarged scale, and shows the location of a heat exchanger disposed in a neck portion.

FIG. 2 illustrates, on an enlarged scale, the place of installation (assembly A) of the two heat exchangers 17. The end face walls of the shell 8 (FIG. 2) have a neck portion 18 while the end face walls of the shield 10 have a neck portion 19. The neck portions 18 located within the neck portion 19 surround the shaft 2. There is a gap between the neck portions 18, and 19. The edges of the neck portions 18, 19 are connected with the help of a vacuum-tight seam; the gap between the neck portions 18, 19 communicates with the evacuated space between the rotor 1 and the casing 5 and a vacuum is maintained within the gap. The neck portions 18, 19 face that end of the shaft 2 on which they are located. The two heat exchangers 17 and are disposed within the neck portions 18, 19.

Figure 3:
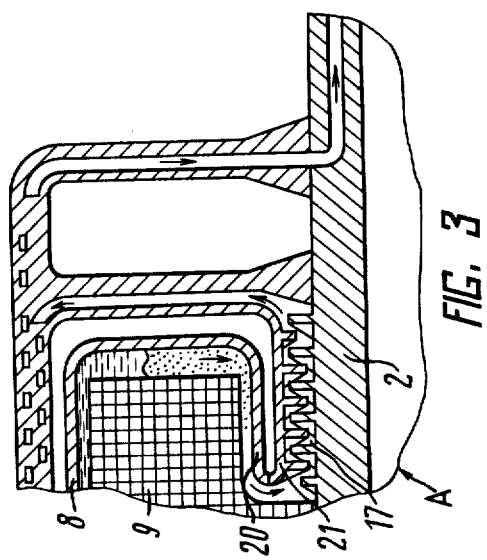
FIG. 3 shows an enlarged fragmentary, sectional view of another embodiment of the assembly A of FIG. 1.

FIG. 3 illustrates another embodiment of the assembly A of FIG. 2. In this embodiment, the neck portions 20, 21 extend from that end of the shaft 2 on which they are located with the result that the length of the shaft 2 can be decreased.

Figure 4:
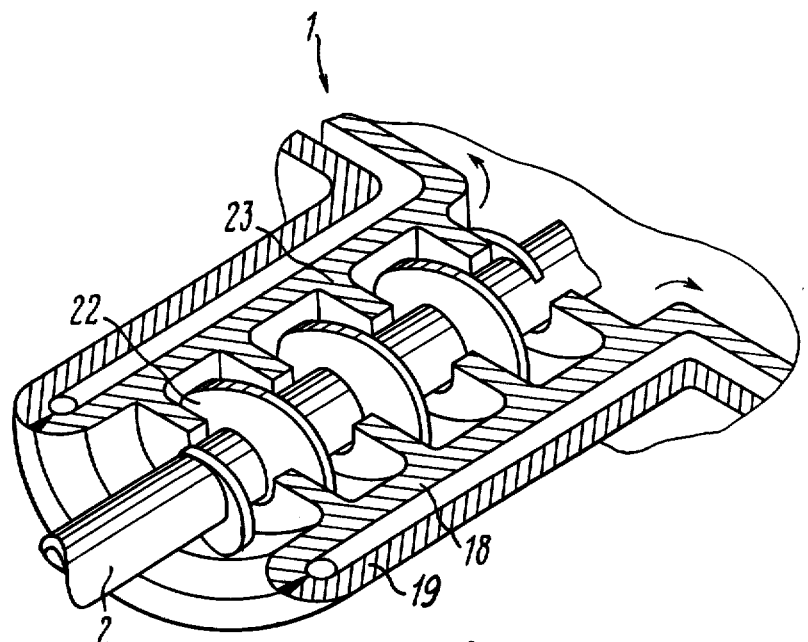
FIG. 4 is a fragmentary view of the assembly A of FIG. 1, but illustrating the heat exchanger in perspective.

FIG. 4 illustrates the heat exchanger 17 which is suitably made in the form of helical ribs 22 on the shaft 2 and helical ribs 23 within the neck portion 18, and said helical ribs 22, 23 are arranged in spaced relationship with respect to each other.

The superconducting field winding 9 (FIG. 1) of the proposed machine is cooled in the following manner. The coolant 11 delivered, under a certain pressure, from a refrigerator (not shown) passes through the conduit 12 into the cavity of the rotor 1 and flows outwardly of the winding 9 to cool same. Then, the coolant 11 leaves the cavity of the rotor 1 and passes through the two heat exchangers 17 to cool the shaft 2 and the neck portion 18 of the shell 8. After passage through the two heat exchangers 17, the coolant 11 passes through the annular chambers 13, thereby cooling the end face walls of the shield 10, and then passes through the ducts 14 to cool the shield 10. After leaving the shield 10, the coolant 11 flows through the ducts 15 of the shaft 2 to cool same and is then fed into the gas collectors 16.

What is claimed is:

1. An electrical machine with cryogenic cooling, comprising:

an outer casing;

a stator winding disposed within and on the inner surface of said outer casing;

a hollow rotor rotatably disposed within said outer casing which is provided with end face walls at opposite ends thereof;

a shaft supporting said hollow rotor;

a superconducting field winding disposed within said hollow rotor and rigidly fixed to said shaft;

a space between said outer casing supporting said stator winding and said hollow rotor, and said space adapted to be evacuated and maintained under a vacuum;

a thermal/electromagnetic shield disposed within said space and provided with end face walls and supported by said shaft;

a coolant adapted to be fed into said hollow rotor and to said thermal/electromagnetic shield;

a plurality of ducts for the circulation of said coolant, provided in said thermal/electromagnetic shield to cool said shield;

annular chambers for passing said coolant to said thermal/electromagnetic shield, and said annular chambers are disposed in close proximity to said end face walls of said hollow rotor;

neck portions in said end face walls of said hollow rotor and in said end face walls of said thermal/electromagnetic shield, having a gap therebetween in communication with said space between said hollow rotor and said shaft, and said neck portions being disposed coaxially with said shaft of said hollow rotor and being arranged in a spaced relationship to form said gap;

said neck portions having their edges interconnected so as to form a seal; and heat exchangers disposed within said neck portions for preventing heat influx to said cavitiy of said hollow rotor.

2. An electrical machine with cryogenic cooling as claimed in claim 1, further comprising:

helical ribs on said shaft of said hollow rotor and within said neck portions forming said heat exchangers; and said helical ribs are arranged in a spaced relationship.

3. An electrical machine with cryogenic cooling, as claimed in claim 1, wherein said neck portions extend outwardly from said shield and said hollow rotor toward the ends of said shaft.

4. An electrical machine with cryogenic cooling, as claimed in claim 1, wherein said neck portion extend inwardly from said shield and said hollow rotor toward the center of said shaft.

5. An electrical machine with cryogenic cooling, as claimed in claim 1, wherein said thermal/electromagnetic shield is in the form of a substantially hollow cylinder with said end face walls thereof forming chambers with said end face walls of said hollow rotor.

6. An electrical machine with cryogenic cooling, as claimed in claim 5, wherein said chambers are in communication with said hollow rotor for directing gases formed by said coolant from ducts in said thermal/electromagnetic shield, to return ducts at the ends of said hollow shaft for delivering said gas to gas collectors disposed externally of said outer casing.

* * * * *